United States Patent
Lin et al.

(10) Patent No.: US 10,977,482 B2
(45) Date of Patent: Apr. 13, 2021

(54) OBJECT ATTRIBUTION ANALYZING METHOD AND RELATED OBJECT ATTRIBUTION ANALYZING DEVICE

(71) Applicant: VIVOTEK INC., New Taipei (TW)

(72) Inventors: Kuan-Yu Lin, New Taipei (TW); Chun-Yi Wu, New Taipei (TW); Sheng-Yuan Chen, New Taipei (TW)

(73) Assignee: VIVOTEK INC., New Taipei (TW)

( * ) Notice: Subject to any disclaimer, the term of this patent is extended or adjusted under 35 U.S.C. 154(b) by 143 days.

(21) Appl. No.: 16/525,509

(22) Filed: Jul. 29, 2019

(65) Prior Publication Data

US 2020/0051284 A1    Feb. 13, 2020

(30) Foreign Application Priority Data

Aug. 7, 2018 (TW) .................................. 107127329

(51) Int. Cl.
  *G06K 9/00*    (2006.01)
(52) U.S. Cl.
  CPC ..... *G06K 9/00261* (2013.01); *G06K 9/00744* (2013.01)
(58) Field of Classification Search
  CPC ................. G06K 9/00221–2009/00328; G06K 9/00744–9/00751
  See application file for complete search history.

(56) References Cited

U.S. PATENT DOCUMENTS

| | | | |
|---|---|---|---|
| 6,111,517 A | 8/2000 | Atick | |
| 8,731,249 B2 | 5/2014 | Bigioi | |
| 2014/0140625 A1* | 5/2014 | Zhang | G06K 9/00677 382/195 |
| 2015/0154472 A1* | 6/2015 | Yano | G06F 16/583 382/219 |
| 2020/0082156 A1* | 3/2020 | Dehghan | H04N 5/23219 |
| 2020/0082549 A1* | 3/2020 | Dehghan | G06T 7/70 |

FOREIGN PATENT DOCUMENTS

| | | |
|---|---|---|
| TW | 201203134 A1 | 1/2012 |
| TW | 201218095 A1 | 5/2012 |

* cited by examiner

*Primary Examiner* — Justin P. Misleh
(74) *Attorney, Agent, or Firm* — Winston Hsu

(57) ABSTRACT

An object attribution analyzing method applied to an object attribution analyzing device and includes dividing a plurality of continuous frames into a current frame and several previous frames, utilizing face detection to track and compute a first attribution predicted value of an object within the current frame, utilizing the face detection to acquire a feature parameter of the object within the current frame for setting a first weighting, acquiring a second attribution predicted value of the object within the several previous frames, setting a second weighting in accordance with the first weighting, and generating a first induction attribution predicted value of the object within the plurality of continuous frames via the first attribution predicted value weighted by the first weighting and the second attribution predicted value weighted by the second weighting.

20 Claims, 6 Drawing Sheets

OBJECT ATTRIBUTION ANALYZING METHOD AND RELATED OBJECT ATTRIBUTION ANALYZING DEVICE

BACKGROUND OF THE INVENTION

1. Field of the Invention

The present invention relates to an object attribution analyzing method and a related object attribution analyzing device, and more particularly, to an object attribution analyzing method and a related object attribution analyzing device capable of increasing its accuracy referring to previous analyzing information.

2. Description of the Prior Art

Please refer to FIG. 1. FIG. 1 is a diagram of variation of an attribution predicted value of an object within continuous frames output by the conventional camera in the prior art. The conventional camera has an image analyzing function of determining a specific attribution of the object from one frame. The object can be a human or a vehicle inside a monitoring image, and the specific attribution can be an invariable property of the object. For example, the specific attribution can be gender, ages, the color of skin or hair, or a height of the human, or a brand or color of the vehicle. As an example of the human, when the human walks through a monitoring area of the camera, the camera can generate a plurality of continuous frames Is, which contain a pattern of the human. An angle or a distance of the human relative to the camera may be changed or the human may be sheltered by building when the human walks, which results in violent change of the attribution predicted value of the same object within the several frames; in the meantime, an attribution predicted value output by the conventional camera is irregularly varied. A curve C1 can represent variation of the attribution predicted value within the continuous frames Is. The predicted value is irregularly increased and decreased within different frames. The attribution predicted result lower than the attribution predicted value P may define the gender of male, and the attribution predicted result higher than the attribution predicted value P may define the gender of female. Although the object traced within the plurality of continuous frames Is should be the same person, the predicting function of the conventional camera cannot confirm its correct attribution among different frames. For example, the conventional camera may output an identifying result of the human being a male due to some frames, and then output another identifying result of the human being a female due to other frames; the conventional camera cannot provide correct identifying solution. Therefore, design of an identifying technology capable of effectively increasing object attribution predicted accuracy is an important issue in the monitoring industry.

SUMMARY OF THE INVENTION

The present invention provides an object attribution analyzing method and a related object attribution analyzing device capable of increasing its accuracy referring to previous analyzing information for solving above drawbacks.

According to the claimed invention, an object attribution analyzing method includes dividing a plurality of continuous frames into a current frame and several previous frames, utilizing face detection to track and compute a first attribution predicted value of an object within the current frame, utilizing the face detection to acquire a feature parameter of the object within the current frame for setting a first weighting, acquiring a second attribution predicted value of the object within the several previous frames, setting a second weighting in accordance with the first weighting, and generating a first inducted attribution predicted value of the object within the plurality of continuous frames via the first attribution predicted value weighted by the first weighting and the second attribution predicted value weighted by the second weighting.

According to the claimed invention, an object attribution analyzing device includes a receiver and a processor. The receiver is adapted to receive a plurality of continuous frames. The processor is electrically connected to the receiver. The processor is adapted to divide the plurality of continuous frames into a current frame and several previous frames, utilize face detection to track and compute a first attribution predicted value of an object within the current frame, utilize the face detection to acquire a feature parameter of the object within the current frame for setting a first weighting, acquire a second attribution predicted value of the object within the several previous frames, set a second weighting in accordance with the first weighting, and generate a first inducted attribution predicted value of the object within the plurality of continuous frames via the first attribution predicted value weighted by the first weighting and the second attribution predicted value weighted by the second weighting.

The object attribution analyzing method and the object attribution analyzing device of the present invention can utilize a large quantity of attribution predicted values within the frames to determine the accurate attribution predicted result. In a conventional way, the attribution predicted value of the object within a monitoring region may be varied violently or disappeared in some situations, such as the exposed image or the object being sheltered; thus, the conventional way of utilizing a single frame to determine attribution of the object cannot acquire a correct result. The object attribution analyzing method of the present invention can utilize the same attribution predicted value of the same object within the previous frame and the current frame or the latest frame to effectively minimize the variability of the attribution predicted result. Even though attribution of the object traced within the current frame or the latest frame cannot be detected and identified, a predicted value of the object's attribution can be continuously output via the attribution induction result of the same object within the previous frames.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
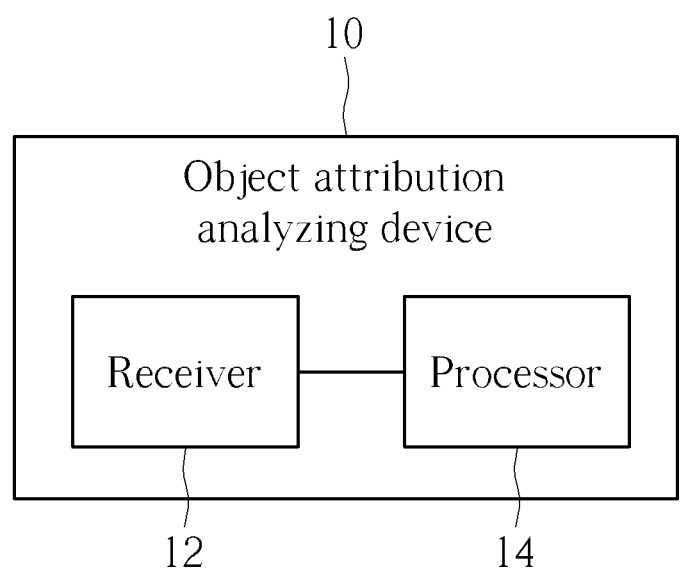
FIG. 2 is a functional block diagram of an object attribution analyzing device according to an embodiment of the present invention.

Please refer to FIG. 2. FIG. 2 is a functional block diagram of an object attribution analyzing device 10 according to an embodiment of the present invention. The object attribution analyzing device 10 can utilize previous and latest analyzing information of a frame tracing result to predict object attribution within the frame. The object attribution analyzing device 10 can be a network video recorder (NVR) connected to a camera in a wire manner or in a wireless manner. The object attribution analyzing device 10 further can be modularized equipment installed inside the camera. The object attribution analyzing device 10 can include a receiver 12 and a processor 14. As the object attribution analyzing device 10 is the network video recorder, the receiver 12 can receive a plurality of continuous frames from the external camera; as the object attribution analyzing device 10 is a built-in module of the camera, the receiver 12 can receive the plurality of continuous frames acquired by an image capturing unit of the camera. The camera can provide an object tracing function, which can trace the object inside the frame via face detection technology. The processor 14 can be electrically connected to the receiver 12. The processor 14 can predict the object attribution according to some or all tracing and analyzing information of the continuous frames. The object attribution analyzed and predicted by the present invention preferably can be a fixed feature of the object.

Figure 1:
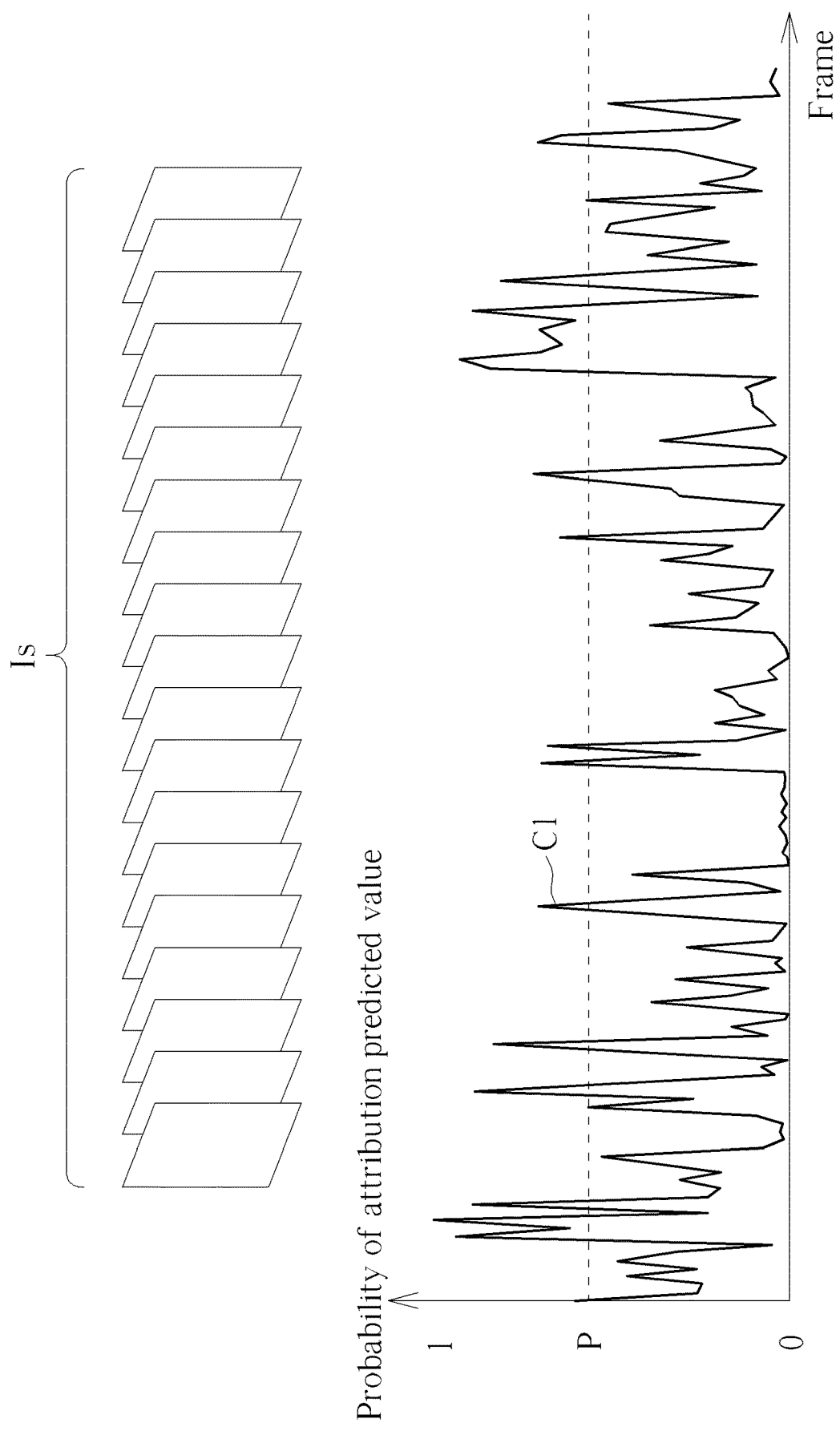
FIG. 1 is a diagram of variation of an attribution predicted value of an object within continuous frames output by the camera in the prior art.
Figure 3:
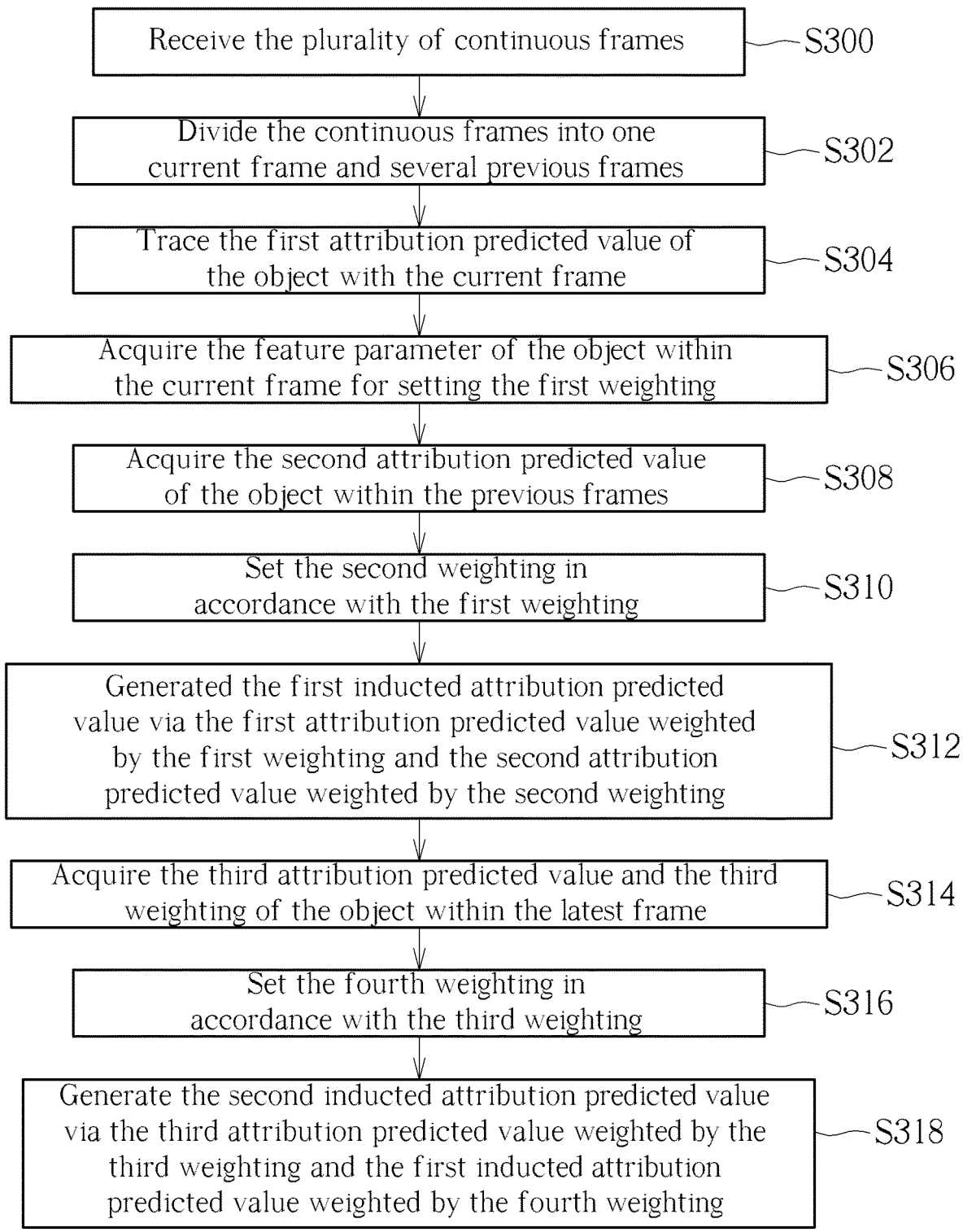
FIG. 3 is a flow chart of an object attribution analyzing method according to the embodiment of the present invention.
Figure 4:
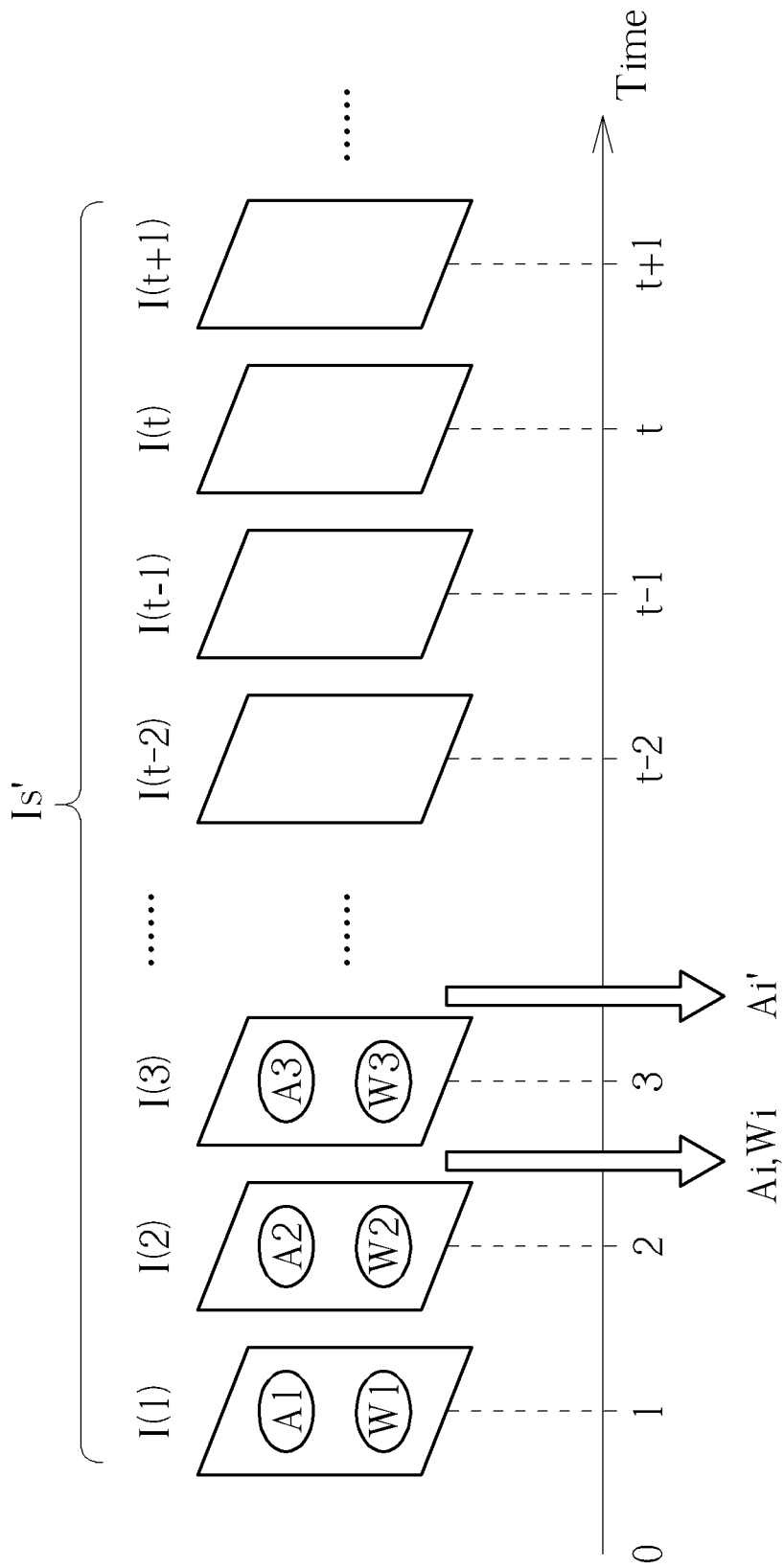
FIG. 4 is a diagram of several frames arranged in a sequence of time according to the embodiment of the present invention.
Figure 5:
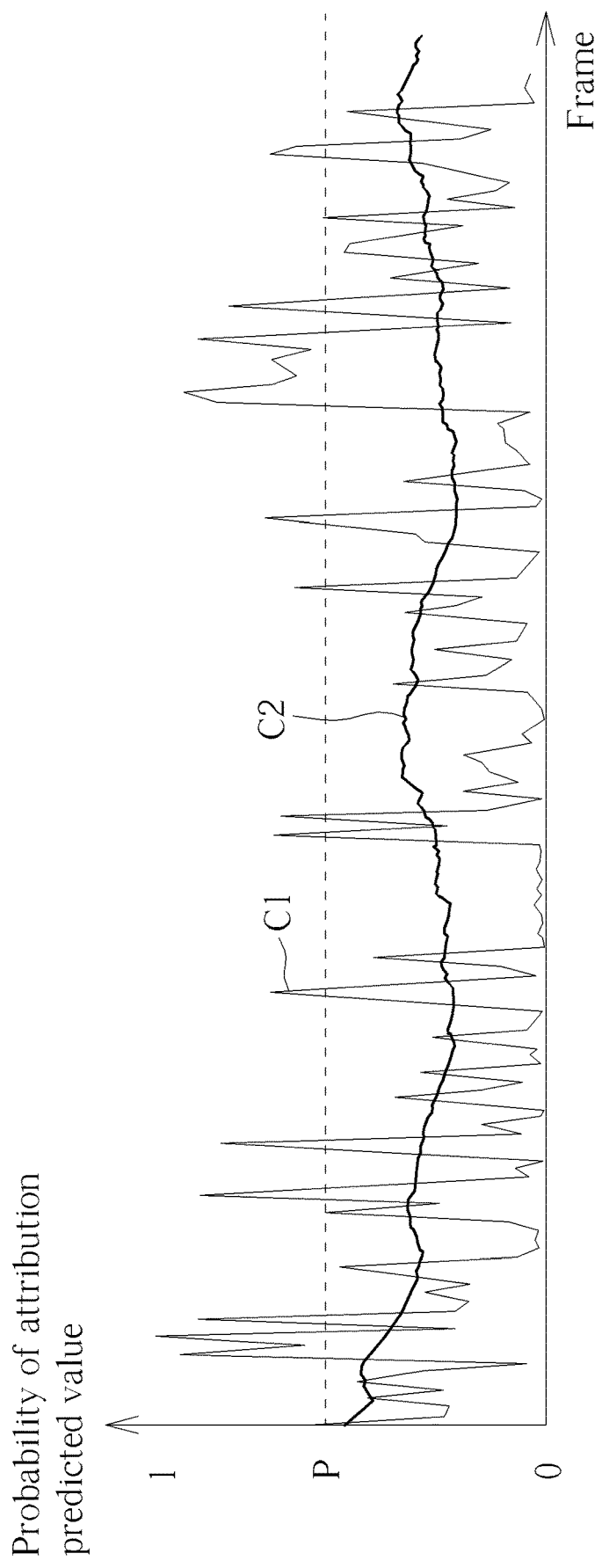
FIG. 5 is a diagram of an attribution predicted result generated by the object attribution analyzing method according to the embodiment of the present invention.

Please refer to FIG. 2 to FIG. 5. FIG. 3 is a flow chart of an object attribution analyzing method according to the embodiment of the present invention. FIG. 4 is a diagram of several frames arranged in a sequence of time according to the embodiment of the present invention. FIG. 5 is a diagram of an attribution predicted result generated by the object attribution analyzing method according to the embodiment of the present invention. The object attribution analyzing method illustrated in FIG. 3 can be suitable for the object attribution analyzing device 10 shown in FIG. 1. The object attribution analyzing device 10 of the present invention can utilize the analyzing information of all the continuous frames Is' to induct the attribution predicted result with great accuracy. First, steps S300 and S302 are executed that the receiver 12 can receive the plurality of continuous frames Is', and the processor 14 can divide the plurality of continuous frames Is' into one current frame I(t) and several previous frames I(1)~I(t−1). Then, steps S304 and S306 are executed that the face detection technology is utilized to trace and compute a first attribution predicted value of the object within the current frame I(t), and acquire a feature parameter of the object within the current frame I(t) for setting a first weighting.

For example, if the object is a human being, a first attribution value can be human gender, and the feature parameter can be selected from a group consisting of a blurred level of the object, a dimensional ratio of the object within the current frame I(t), an angle of the object relative to the camera, a distance of the object relative to the camera, and a combination thereof. If the face detection technology computes the first attribution predicted value of the human being, but detects a pattern about the human is blurred due to interference of ambient illumination, or due to a pattern about the human face being small in the frame, or due to a pattern about the human head showing a lateral face, the face detection technology can set the first weighting with a lower value for the first attribution predicted value according to the feature parameter within the current frame I(t). If the pattern about the human is clear, the pattern about the human face has large ratio in the frame, or the pattern about the human head shows a front face, the face detection technology can set the first weighting with a higher value.

Then, steps S308 and S310 are executed that the processor 14 can acquire a second attribution predicted value of the object within the previous frames I(1)~I(t−1), and set a second weighting in accordance with the first weighting. Generally, the second attribution predicted value can be an induction result of a final frame I(t−1) and some earlier frames I(1)~I(t−2) from the several previous frames I(1)~I(t−1) respectively weighted by different weighting. A sum of the first weighting and the second weighting can be a specific value. The first weighting can be adjusted according to change of the feature parameter. The first weighting can be inversely proportional to the second weighting; the second weighting can be computed by subtracting the first weighting from the specific value. For example, if the specific value equals 1.0, the first weighting can be 0.02 and the second weighting can be 0.98, or the first weighting can be 0.05 and the second weighting can be 0.95. Then, step S312 can be executed to generated a first inducted attribution predicted value via the first attribution predicted value weighted by the first weighting and the second attribution predicted value weighted by the second weighting. The first inducted attribution predicted value can be the attribution predicted result of the object at a point of time t. The first inducted attribution predicted value may be a sum value, an average value or a weighted mean value of the first attribution predicted value weighted by the first weighting and the second attribution predicted value weighted by the second weighting. Computation of the inducted attribution predicted value in the present invention is not limited to the above-mentioned embodiment, which depends on design demand.

Step S314 can be executed to acquire a latest frame I(t+1), and compute a third attribution predicted value and a third weighting of the object within the latest frame I(t+1). Then, steps S316 and S318 can be executed to set a fourth weighting in accordance with the third weighting, and generate a second inducted attribution predicted value via the third attribution predicted value weighted by the third weighting and the first inducted attribution predicted value weighted by the fourth weighting. The second inducted attribution predicted value can be an attribution predicted result of the object at a point of time (t+1). When computing one attribution predicted value at any point of time, the object attribution analyzing method can acquire the attribution predicted value of the object at one point of time and the attribution predicted value of the object during a previous period, and the foresaid attribution predicted values can be respectively matched with different weighting for acquiring the induction result. Thus, the latest attribution predicted result can be obviously influenced by the frame and the attribution predicted value acquired at the latest point of time; in addition, frames acquired before the latest point of time are represented as one unity, and the latest attribution predicted result can be influenced by a total inducted attribution of the said unity. The present invention does not analyze all the frames before the latest point of time one-by-one, so as to economize an analysis period and decrease a computation demand of the object attribution analyzing device 10.

As the frames shown in FIG. 4, when the object attribution analyzing method is actuated, the face detection technology is utilized to acquire an attribution predicted value A1 of the frame I(1) at the point of time (t=1). Then, the object attribution analyzing method can trace and compute an attribution predicted value A2 of the frame I(2) at the point of time (t=2), and set the weighting W2 according to the feature parameter of the object within the frame I(2); the weighting W1 can be set accordingly, and the attribution predicted value A1 weighted by the weighting W1 and the attribution predicted value A2 weighted by the weighting W2 can be used to generate an inducted attribution predicted value Ai at this point of time. At the point of time (t=3), the object attribution analyzing method can trace and compute an attribution predicted value A3 of the frame I(3), and set the weighting W3 according to the feature parameter of the object within the frame I(3); the weighting Wi can be set accordingly, and the attribution predicted value A3 weighted by the weighting W3 and the inducted attribution predicted value Ai weighted by the weighting Wi can be used to generate an inducted attribution predicted value Ai' at this point of time. Computation of the inducted attribution predicted value about other points of time can be acquired via the above-mentioned process. All the frames are divided into one current frame (or one latest frame) and several previous frames, which are weighted by different weighting to compute the latest attribution predicted value. As shown in FIG. 5, recording of the attribution predicted value output by the conventional camera which is illustrated as a curve C1 may be violently increased and decreased among the frames; recording of attribution predicted value output by the object attribution analyzing method of the present invention which is illustrated as a curve C2 can effectively decrease its variability, and accuracy of the attribution predicted result can be increased accordingly. In the embodiment, the attribution predicted value of the object within the frame acquired at the latest point of time can provide large influence upon the latest attribution predicted result, and its influenced efficacy is decided by the weighting about the feature parameter of the object within the frame acquired at the latest point of time.

Besides, the weighting can be adjusted according to time change. As mentioned above, if an amount of the frame acquired before the latest point of time is less, the first weighting can be set as 0.05 and the second weighting can be set as 0.95, so the latest attribution predicted result can be obviously influenced by the object attribution predicted value within the latest frame. If the amount of the frame acquired before the latest point of time is more, the accuracy of the latest attribution predicted result may be preferred, so that the first weighting can be set as 0.02 and the second weighting can be set as 0.98, for preventing the latest attribution predicted result from being influenced by the object attribution predicted value within the latest frame. Weighting adjustment of the present invention is not limited to the above-mentioned embodiments; for instance, the lower weighting may be applied to a situation with the less previous frames, and the higher weighting may be applied to the situation with the more previous frames, which depends on actual demand.

In other embodiment, the attribution predicted values of the object within the frames at all points of time can be set as having the same influence upon the latest attribution predicted result. For example, at one point of time (t=3), the object attribution analyzing method of the present invention may adjust the attribution predicted value A1, the attribution predicted value A2 and the attribution predicted value A3 respectively by the weighting W1, the weighting W2 and the weighting W3, and a sum of those attribution predicted values weighted by the corresponding weighting can be represented as the inducted attribution predicted value at this point of time. That is to say, factors which may influence the latest attribution predicted result can be averagely proportioned to predicted object attribution within the frames acquired at every point of time in this embodiment.

Figure 6:
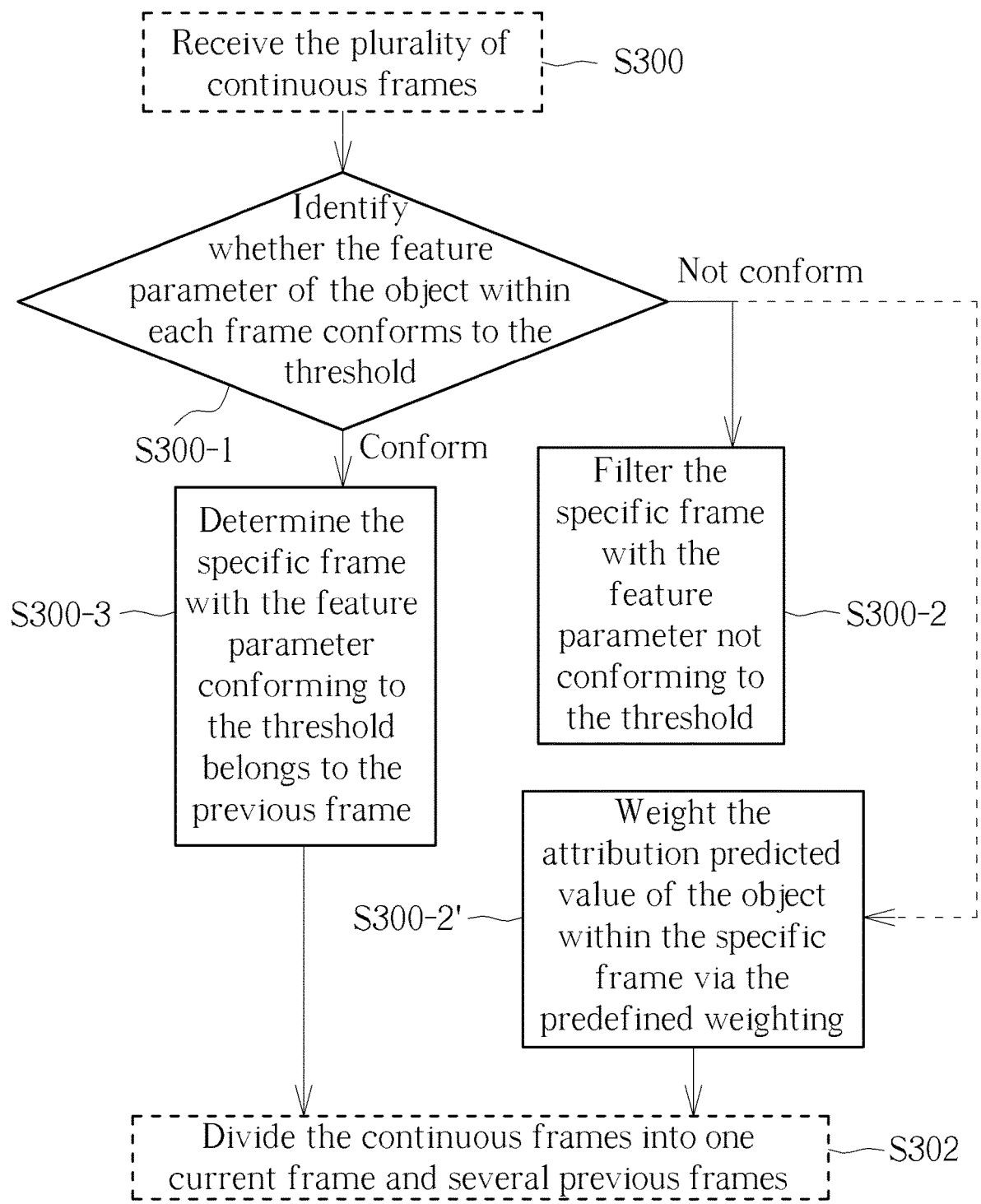
FIG. 6 is a flow chart of the object attribution analyzing method according to another embodiment of the present invention.

It should be mentioned that the object attribution analyzing method of the present invention can optionally filter the continuous frames Is', and retain the frames with the feature parameter conforming to a demand for induction process. Please refer to FIG. 2 and FIG. 6. FIG. 6 is a flow chart of the object attribution analyzing method according to another embodiment of the present invention. The object attribution analyzing method illustrated in FIG. 6 can be suitable for the object attribution analyzing device 10 shown in FIG. 1. After step S300, the object attribution analyzing method can optionally execute step S300-1 to identify whether the feature parameter of the object within each of the continuous frames Is' conforms to a threshold. If the feature parameter does not conform to the threshold, step S300-2 can be executed to filter one or some specific frames with the feature parameter not conforming to the threshold, and remove the specific frame from the previous frames; therefore the previous frames are not continuous in a sequence of time. If the frame with the feature parameter not conforming to the threshold is generated at the latest point of time, the weighting of the frame acquired at the latest point of time can be set as zero. If the feature parameter conforms to the threshold, step S300-3 can be executed that the specific frame with the feature parameter conforming to the threshold can be set belonging to the previous frames or the frame acquired at the latest point of time, and then step S302 can be executed continuously.

For example, the threshold mentioned in step S300-1 can be a predefined blurred value. If the blurred level of some frames is worse than the predefined blurred value (which means the feature parameter does not conform to the threshold), it is difficult to acquire the accurate object attribution predicted value within the said frames via the face detection technology, so that the said frames can be removed for increasing the accuracy of the latest attribution predicted result. If the blurred level of the frames is better than the predefined blurred value, the face detection technology can acquire the accurate object attribution predicted value within the said frames, so that the said frames can be retained for being a benefit of tracing, predicting and inducting the attribution. In the embodiment, the threshold is not limited to the blurred value, and further can be designed as the dimensional ratio of the object within the frame, and the angle or the distance of the object relative to the camera, which depends on selection of the feature parameter.

Moreover, if an identifying result of the object attribution analyzing method determines that the feature parameter within the specific frame does not conform to the threshold, step S300-2' can be optionally executed to weight the attribution predicted value of the object within the specific frame via a predefined weighting instead of filtering the specific frame, and to assign that the specific frame belongs to the previous frame or the frame acquired at the latest point of time. In step S300-2', it may be difficult to acquire the accurate object attribution predicted value within the specific frame by the face detection technology, but still may possibly acquire the correct attribution predicted value, so that the predefined weighting smaller than other weighting (such as the first weighting and/or the second weighting) can be utilized to decrease influence of the object attribution predicted value within the specific frame upon the latest attribution predicted result. The object attribution analyzing method may execute steps S300-2 and S300-2' alternatively, which depends on actual demand.

In conclusion, the object attribution analyzing method and the object attribution analyzing device of the present invention can utilize a large quantity of attribution predicted values within the frames to determine the accurate attribution predicted result. In a conventional way, the attribution predicted value of the object within a monitoring region may be varied violently or disappeared in some situations, such as the exposed image or the object being sheltered; thus, the conventional way of utilizing a single frame to determine attribution of the object cannot acquire a correct result. Comparing to the prior art, the object attribution analyzing method of the present invention can utilize the same attribution predicted value within the previous frame and the current frame or the latest frame to effectively minimize the variability of the attribution predicted result. Even though attribution of the object traced within the current frame or the latest frame cannot be detected and identified, a predicted value of the object's attribution can be continuously output via the attribution induction result of the same object within the previous frames.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object attribution analyzing method, comprising:
   dividing a plurality of continuous frames into a current frame and several previous frames;
   utilizing face detection to track and compute a first attribution predicted value of an object within the current frame;
   utilizing the face detection to acquire a feature parameter of the object within the current frame for setting a first weighting;
   acquiring a second attribution predicted value of the object within the several previous frames;
   setting a second weighting in accordance with the first weighting; and
   generating a first inducted attribution predicted value of the object within the plurality of continuous frames via the first attribution predicted value weighted by the first weighting and the second attribution predicted value weighted by the second weighting.

2. The object attribution analyzing method of claim 1, further comprising:
   acquiring a latest frame after the plurality of continuous frames;
   utilizing the face detection to track and compute a third attribution predicted value of the object within the latest frame;
   utilizing the face detection to acquire the feature parameter of the object within the latest frame for setting a third weighting;
   setting a fourth weighting in accordance with the third weighting; and
   generating a second inducted attribution predicted value of the object via the third attribution predicted value weighted by the third weighting and the first inducted attribution predicted value weighted by the fourth weighting.

3. The object attribution analyzing method of claim 1, wherein the second attribution predicted value is an induction result of a final frame and some earlier frames from the several previous frames respectively weighted by different weighting.

4. The object attribution analyzing method of claim 1, further comprising:
   searching a specific frame with the feature parameter not conforming to a threshold from the plurality of continuous frames; and
   removing the specific frame from the previous frames.

5. The object attribution analyzing method of claim 4, wherein the first weighting equals zero when the feature parameter of the current frame does not conform to the threshold.

6. The object attribution analyzing method of claim 4, wherein the previous frames are not continuous during a time sequence.

7. The object attribution analyzing method of claim 1, further comprising:
   searching a specific frame with the feature parameter conforming to a threshold from the plurality of continuous frames; and
   defining the specific frame is one of the previous frames.

8. The object attribution analyzing method of claim 1, further comprising:
   searching a specific frame with the feature parameter not conforming to a threshold from the plurality of continuous frames; and
   generating the first inducted attribution predicted value via an attribution predicted value of the object within the specific frame weighted by a predefined weighting.

9. The object attribution analyzing method of claim 8, wherein the predefined weighting is smaller than the first weighting or the second weighting.

10. The object attribution analyzing method of claim 1, wherein the first attribution predicted value and the second attribution predicted value are acquired by a fixed feature of the object.

11. The object attribution analyzing method of claim 1, wherein the feature parameter is selected from a group consisting of a blurred level of the object, a dimensional ratio of the object within the current frame, an angle of the object relative to a camera, a distance of the object relative to the camera, and a combination thereof.

12. The object attribution analyzing method of claim 1, wherein the first weighting is adjusted according to change of the feature parameter, and the first weighting is inversely proportional to the second weighting.

13. The object attribution analyzing method of claim 1, wherein the first inducted attribution predicted value is a sum value, an average value or a weighted mean value of the first attribution predicted value weighted by the first weighting and the second attribution predicted value weighted by the second weighting.

14. An object attribution analyzing device, comprising:
   a receiver adapted to receive a plurality of continuous frames; and
   a processor electrically connected to the receiver, the processor being adapted to divide the plurality of continuous frames into a current frame and several previous frames, utilize face detection to track and compute a first attribution predicted value of an object within the current frame, utilize the face detection to acquire a feature parameter of the object within the current frame for setting a first weighting, acquire a second attribution predicted value of the object within the several previous frames, set a second weighting in accordance with the first weighting, and generate a first inducted attribution predicted value of the object within the plurality of continuous frames via the first attribution predicted value weighted by the first weighting and the second attribution predicted value weighted by the second weighting.

15. The object attribution analyzing device of claim 14, wherein the processor is further adapted to acquire a latest frame after the plurality of continuous frames, utilize the face detection to track and compute a third attribution predicted value of the object within the latest frame, utilize the face detection to acquire the feature parameter of the object within the latest frame for setting a third weighting, set a fourth weighting in accordance with the third weighting, and generate a second inducted attribution predicted value of the object via the third attribution predicted value weighted by the third weighting and the first inducted attribution predicted value weighted by the fourth weighting.

16. The object attribution analyzing device of claim 14, wherein the second attribution predicted value is an induction result of a final frame and some earlier frames from the several previous frames respectively weighted by different weighting.

17. The object attribution analyzing device of claim 14, wherein the processor is further adapted to search a specific frame with the feature parameter not conforming to a threshold from the plurality of continuous frames, and remove the specific frame from the previous frames.

18. The object attribution analyzing device of claim 14, wherein the processor is further adapted to search a specific frame with the feature parameter conforming to a threshold from the plurality of continuous frames, and define the specific frame is one of the previous frames.

19. The object attribution analyzing device of claim 14, wherein the processor is further adapted to search a specific frame with the feature parameter not conforming to a threshold from the plurality of continuous frames, and generate the first inducted attribution predicted value via an attribution predicted value of the object within the specific frame weighted by a predefined weighting.

20. The object attribution analyzing device of claim 14, wherein the first inducted attribution predicted value is a sum value, an average value or a weighted mean value of the first attribution predicted value weighted by the first weighting and the second attribution predicted value weighted by the second weighting.

* * * * *